United States Patent Office 3,449,031
Patented June 10, 1969

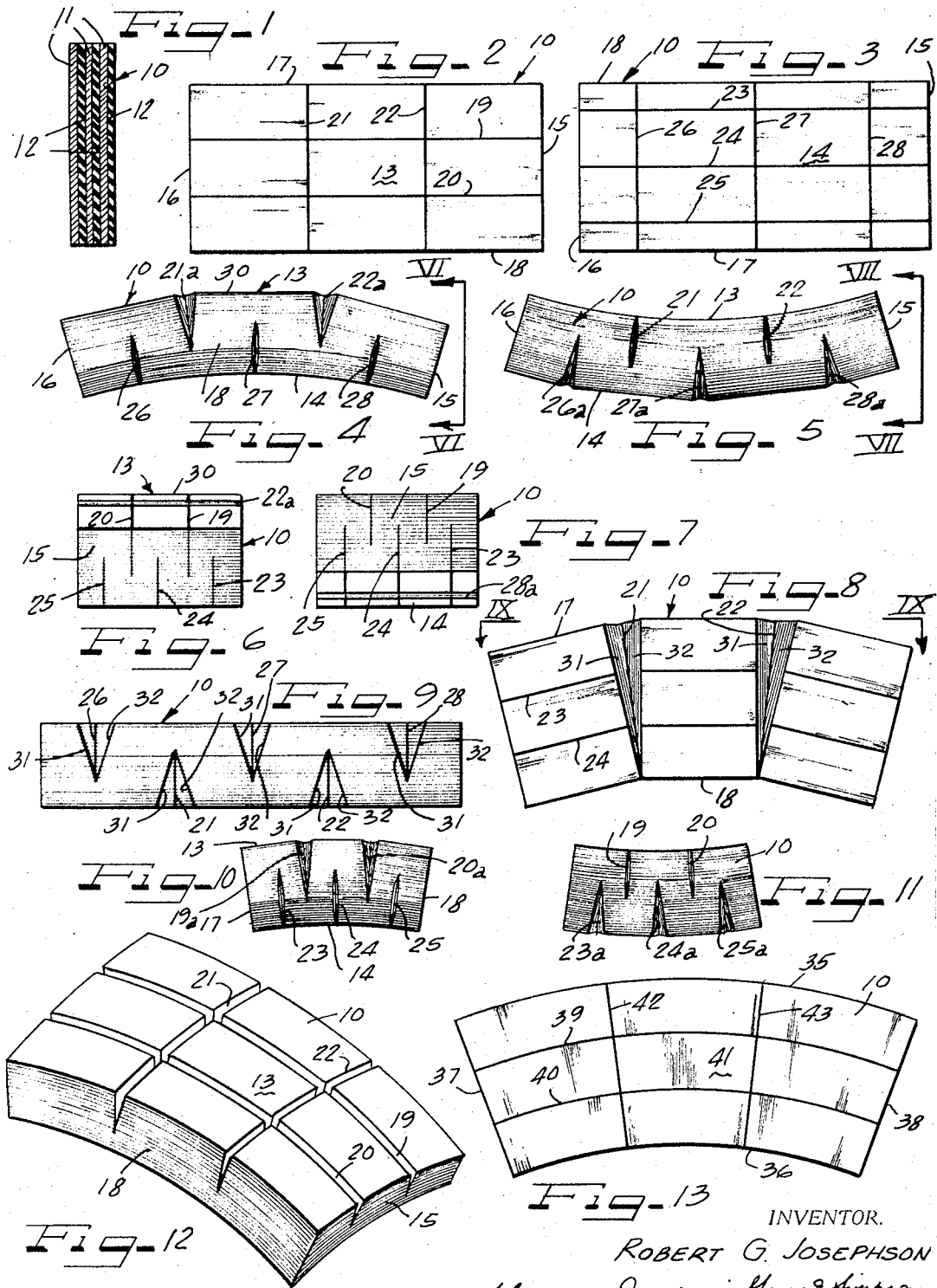

3,449,031
LAMINATED BEARING ADAPTED TO BEND IN A PLURALITY OF PLANES
Robert G. Josephson, Jamestown, N.Y., assignor to TRW Inc., Cleveland, Ohio, a corporation of Ohio
Filed June 22, 1967, Ser. No. 648,105
Int. Cl. F16c 27/02, 27/06
U.S. Cl. 308—237                8 Claims

ABSTRACT OF THE DISCLOSURE

A laminated bearing capable of conforming to non-planar mating surfaces. The bearing consists of a plurality of thin laminae of alternating metal and elastomer bonded together to provide a laminated planar bearing. A mosaic of cuts is provided into the bearing stack from opposite faces thereof. The cuts do not extend through the bearing to the opposite face but terminate in the bearing stack.

BACKGROUND OF THE INVENTION

Field of the invention

This invention relates to bearings and more particularly to laminated bearings, and provides for a laminated bearing which is planar in its free state while able to readily conform to non-planar mating surfaces.

Prior art

Laminated bearings composed of a plurality of thin laminae of alternate metal and elastomer are known to the art. See, for example, the patents to Hinks, Patent Nos. 2,900,182 and 3,071,422. Such prior art laminated bearings can be produced in planar and non-planar configurations. However, such prior art laminated bearings when produced in the planar configuration do not easily conform to non-planar mating surfaces, while the prior art bearings produced in non-planar configurations are difficult and expensive to manufacture.

SUMMARY

The present invenion provides for an economical and efficient laminated bearing which is produced in a planar state but which is capable of readily conforming to non-planar mating surfaces.

Experience in laminated bearings has disclosed that they are most economically manufactured when the individual laminae sheets of metal and elastomer are planar and the resulting stack is planar. However, it is often desirable to use laminated bearings in situations where they will have to operate in a curved or non-planar configuration. Although it is possible to produce laminated bearings formed into non-planar configurations, such production is more expensive and difficult than the production of planar laminated bearings.

The present invention provides an inexpensively produced planar laminated bearing which is capable of conforming readily to non-planar mating surfaces. The invention consists of a planar laminated bearing composed of a plurality of individual laminae of alternate thin metal strips and elastomer strips bonded together. A mosaic of cuts is provided into the bearing from opposite faces thereof. The cuts or grooves do not extend through all of the laminae of the bearing stack but terminate partway through it. Because the layers of the laminated stack are bonded together, the uncut layers are able to hold the stack together. In a preferred embodiment, the cuts originating from one face are in staggered relationship to the cuts originating from the opposite face. This staggering allows the cuts to extend more than halfway through the bearing stack, without severing the stack.

The cuts are made deep enough and in sufficient number to allow the bearing to assume the desired degree of change from the planar to the non-planar shape. The greater the number of cuts provided and/or the greater the depth of the cuts, the more the bearing is able to conform to radically non-planar mating surfaces.

It is then an object of this invention to provide a planar laminated bearing adapted to bend in a plurality of planes.

It is a further object of this invention to provide a method of increasing the ability of a planar laminated bearing to conform to non-planar mating surfaces.

It is further and more specific an object of this invention to provide a planar laminated bearing having a plurality of cuts impressed into it from one or more faces and effective to increase the ability of the bearing to conform to non-planar shapes.

DESCRIPTION OF THE DRAWINGS

FIGURE 1 is an enlarged cross-sectional view of a laminated bearing showing the alternate layers of metal and rubber;

FIGURE 2 is a top plan view of a laminated bearing embodying the principles of this invention;

FIGURE 3 is a bottom plan view of the bearing of FIGURE 2;

FIGURE 4 is a side elevational view of a laminated bearing such as the bearing of FIGURE 2 flexed or bent downward into a non-planar configuration;

FIGURE 5 shows the bearing of FIGURE 4 flexed or bent upward into an opposite non-planar configuration;

FIGURE 6 is an end view of the bearing of FIGURE 4 taken along the lines VI—VI of FIGURE 4;

FIGURE 7 is an end view of the bearing of FIGURE 5 taken along the lines VII—VII of FIGURE 5;

FIGURE 8 is a top plan view of a laminated bearing similar to the bearing of FIGURE 2 flexed or bent outwardly from a side face;

FIGURE 9 is a side view of the bearing of FIGURE 8 taken along lines IX—IX of FIGURE 8;

FIGURE 10 is an end plan view of a laminated bearing similar to the bearing of FIGURE 2 in a non-planar shape bent downward along its transverse axis;

FIGURE 11 is an end plan view of a bearing similar to the bearing of FIGURE 2 in a non-planar shape bent upward along its transverse axis;

FIGURE 12 is a perspective view of a laminated bearing such as the bearing of FIGURE 2 bent into a convex non-planar shape; and FIGURE 13 is a top plan view of a laminated bearing in an arcuate shape having radial and circumferential cuts therein.

DESCRIPTION OF THE PREFERRED EMBODIMENTS

The preferred embodiment of the bearing of this invention begins as a plurality of sheets of thin metal bonded together with thin layers of elastomer to form a laminated stack. The bearing is produced in a planar form and may be, as by way of example, a parallelepiped. Because of the thinness of the layers of elastomer and metal, the bearing stack is incompressible under normal operating loads. Due to the shear elasticity of the rubber or other elastomer, the bearing stack can allow relative movement between opposed faces which mate with the top and the bottom of the bearing stack without movement of either the top or the bottom face of the bearing stack with respect to its mating face.

Because of the incompressible nature of the laminated bearings of the type above described and because of their ability to allow a relevant movement between opposed faces without rubbing contact between mating faces such bearings are useful in a wide variety of physical embodiments. It is sometimes desirable to use such laminated bearings between opposed faces which have a non-planar configuration. This invention allows initially planar laminated bearings to conform to such non-planar mating faces.

The invention resides in providing a plurality of cuts or grooves in obverse faces of the bearing stack. As shown in FIGURE 1, the bearing 10 consists of a plurality of thin strips of metal, plastic or other non-stretchable material 11 separated by thin layers of elastomer 12. The strips of metal 11 are bonded to the elastomer layers on both sides of the metal strips 11. In this manner, stacks of any desired height may be created by using a greater or lesser number of layers of metal and elastomer.

As shown in FIGURE 2, in a preferred embodiment, the bearing 10 is in the form of a planar parallelepiped having a top face 13, a bottom face 14, end faces 15 and 16 and side faces 17 and 18. A cross hatch of cuts or grooves is formed into the top and bottom faces 13 and 14 of the bearing 10. In the embodiment shown in FIGURES 2 and 3, the cuts are parallel and consist of two cuts 19 and 20 into the top face 13 of the bearing 10. The cuts 19 and 20 extend lengthwise of the bearing from end face 15 to end face 16. Cuts 21 and 22 are also impressed into the top face 13 of the bearing stack 10 and extend from side face 17 to side face 18 intersecting the cuts 19 and 20 at right angles.

Cuts are also provided into the bottom face 14 of the bearing. The cuts impressed into the bottom face are staggered from the cuts impressed into the top face so that it is impossible for the bottom face cuts to meet the top face cuts in such a manner that results in severing a bearing stack. The bottom face cuts consist of cuts 23, 24 and 25 which are parallel and extend lengthwise of the bearing stack 10 from the end face 15 to the end face 16, and cuts 26, 27 and 28 which are also parallel and which extend crosswise of the bearing stack from the side face 17 to the side face 18 and which intersect the cuts 23, 24 and 25 at right angles.

The cuts 21–28 do not extend entirely through the bearing stack 10 but terminate partway into it. In the embodiment illustrated in the drawings as shown in FIGURES 4 and 5, the cuts extend approximately three-quarters of the way through the bearing. However, it is to be understood that the cuts may extend to a lesser or greater depth and that a greater or fewer number of cuts per bearing may be used. The greater number of cuts per unit of bearing surface, the greater the ability of the bearing to conform to non-planar mating faces. Equally, the shallower the depth of the cuts, the greater the planar rigidity of the bearing.

A bearing cut in the manner illustrated in FIGURES 2 and 3 is adaptable to bend into a plurality of non-planar configurations. FIGURE 4 illustrates one such configuration wherein the bottom face 14 of the bearing stack 10 is able to conform to a mating surface which has a radius smaller than a mating surface engaging the top face 13. In such a configuration, the end faces 15 and 16 are below the center portion 30 of the top face 13. The cuts 21 and 22 are opened to provide V-shaped grooves 21a and 22a into the bearing stack extending from the side face 18 to the side face 17. The cuts 26, 27 and 28 will bow out at the intermediate depth portions of the cuts.

FIGURE 5 shows the bearing stack 10 bent in the direction opposite from the direction of bend of FIGURE 4. In this configuration, the top surface 13 is able to conform to a mating face which has a radius smaller than the radius of the mating surface engaging the bottom face 14. In this configuration the cuts 26, 27 and 28 in the bottom face 14 of the bearing stack 10 become V-shaped grooves 26a, 27a and 28a, in the same manner that the cuts 21 and 22 became V-shaped grooves 21a and 22a in FIGURE 4. The cuts 21 and 22 impressed into the top face 13 of the bearing stack 10 will bow out at their intermediate depth portions in the same manner as the slices 26, 27 and 28 bowed out in the configuration shown in FIGURE 4.

FIGURES 6 and 7 show end views of the bearing stack 10 conforming to the configurations of FIGURES 4 and 5. In such configurations where the bearing is required to conform only to a single curved plane where the bottom face must conform to a mating surface whose radius is either larger or smaller than the radius of the mating surface to which the top face must conform, and the curvature is such that the end faces 15 and 16 will extend above or below the top and bottom faces 13 and 14 at their center points, the cuts 19, 20, 23, 24 and 25 which extend lengthwise of the bearing from the end face 15 to the end face 16 do not spread into a V or bow as do either the cuts 21 and 22 or the cuts 26, 27 and 28. In such a configuration, the cuts 19, 20, 23, 24 and 25 do not affect the ability of the bearing stack 10 to conform to the non-planar mating surfaces and if it is desirable to design the bearing stack 10 to be used in an application where the only configurations required of the bearing stack 10 are as shown in FIGURES 4 and 5 then the cuts 19, 20, 23, 24 and 25 may be eliminated.

In FIGURE 8, the bearing stack 10 is shown conforming to a different configuration wherein one of the side walls 18 is bent so as to be able to engage a mating face which has a radius smaller than the radius of the mating face which the side wall 17 is to mate with.

In this configuration, the cuts 21, 22, 26, 27 and 28 are spread partially open. The opening is such as to form the cuts into V-shaped grooves. The apex of the V of each groove is the bottom of that groove where the cut terminates in the bearing stack 10. The walls 31, 32 of the grooves abut each other at side face 18 and spread apart from each other by a distance which increases as the distance from the side face 18 increases until the walls 31, 32 are separated the greatest distance at the side face 17. The walls then form a double V-groove, the apex of one V being the bottom of the groove in the bearing stack and the apex of the other V being at the side face 18.

FIGURE 9 shows a plan view of the side face 17 of a bearing stack 10 which is bent in the manner described above. In such a configuration, all of the cuts 21, 22, 26, 27 and 28 which extend crosswise across the bearing stack 10 are open in the manner described above. The cuts 19, 20, 23, 24 and 25 which extend lengthwise of the bearing stack are not opened and if it is desired to produce a bearing which will be subjected only to configurations of the sort shown in FIGURES 8 and 9, the cuts 19, 20, 23, 24 and 25 extending lengthwise of the bearing may be eliminated. It is, of course, to be understood that although FIGURES 8 and 9 describe the bearing stack 10 as being bent into a configuration where the side face 18 has a smaller radius than the side face 17, the bearing can be equally bent in the opposite configuration.

FIGURE 10 shows yet another configuration into which the bearing can be bent. In this configuration, the curvature is across the width of the bearing stack 10 and is at right angles to the curvature described in FIGURES 4 and 5. In such a curvature it is the longitudinal cuts 19 and 20 which open into V-shaped grooves 19a and 20a. The longitudinal cuts 23, 24 and 25 which are formed in the bottom face 14 become bowed out in the manner of the cuts 26, 27, and 28 in FIGURE 4.

FIGURE 11 illustrates a curvature which is the reverse of the curvature of FIGURE 10. In such a configuration, the cuts 23, 24 and 25 become the V-shaped grooves 23a, 24a and 25a, and the cuts 19 and 20 have their intermediate depth portions bowed out. In a bearing designed specifically to conform to either of the configurations shown in FIGURE 10, or the configuration shown in FIGURE 11, the cuts 21, 22, 26, 27 and 28 which extend across the width of the bearing stack 10 may be eliminated.

In the configurations above described and shown in FIGURES 4 through 11, the bearing stack 10 has in each instance been conformed to a single curvature. However, a bearing such as the bearing shown in FIGURES 2 and 3 can also adapt to a dual curvature situation such as would be required when the bearing is to mate with concave or convex surfaces. FIGURE 12 illustrates a bearing stack 10 having a configuration to mate with a convex mating face on the bottom side and a concave mating face on the top side. In this embodiment, only the cuts 19, 20, 21 and 22 which are impressed into the top face 13 are provided. Each of the cuts 19, 20, 21 and 22 opens into a V-shaped groove. If it was desired to have the top face meet with the convex mating face and the bottom face meet with a concave mating face, then the cuts 23, 24, 25, 26, 27 and 28 could be provided in the bearing stack 10 in place of the cuts 19, 20, 21 and 22.

FIGURE 13 illustrates a further embodiment of the invention described above. In this embodiment, the bearing stack 10—although planar, is not in the form of a parallelepiped. The bearing illustrated has curved side walls 35 and 36 and radial end walls 37 and 38. Cuts 39 and 40 are formed into the top face 41 of the bearing 10. The cuts 39 and 40 have the same curvature as the side walls 35 and 36 and extend from the end face 37 to the end face 38. Non-parallel, radial cuts 42 and 43 extend from the side wall 35 to the side wall 36 and are radial to the same circle that the end faces 37 and 38 are. The bearing illustrated in FIGURE 13 is adapted to work in an embodiment like that of the bearing illustrated in FIGURE 8 but where the curvature is greater. Although FIGURE 13 illustrates one embodiment of a non-parallelepiped bearing constructed according to the teachings of this invention, it is however to be understood that other designs may be used where different configurations are desired.

Although minor modifications might be suggested by those versed in the art, it should be understood that I wish to embody within the scope of the patent granted hereon all such modifications as reasonably and properly come within the scope of my contribution to the art.

I claim as my invention:

1. In a planar bearing composed of alternate layers of sheet material and elastomer bonded together the improvement of a plurality of cuts extending into the bearing from at least one face thereof, some of said cuts intersecting other of said cuts, said cuts terminating in said bearing and effective to adapt the bearing to conform to non-planar mating surfaces.

2. The bearing of claim 1 wherein the sheet material comprises metal.

3. The bearing of claim 1 wherein the sheet material consists of a non-metallic stretch resisting material.

4. A laminated bearing which comprises: a planar bearing stack, said stack including alternating thin layers of metal and elastomer bonded together, a plurality of cuts in said stack, said cuts extending from at least one face of the stack to a depth less than the height of the stack, and said cuts formed without removing material from said stack.

5. The bearing of claim 4 wherein the cuts extend into the bearing stack from opposite faces thereof, and the cuts extending from one face are in staggered relationship with the cuts extending from the opposite face.

6. The bearing of claim 5 wherein the stack is a parallelepiped and at least one of the cuts extending from each face is longitudinal to the stack and at least one of the cuts extending from each face is transverse to the stack resulting in a mosaic of cuts extending into the stack from each face.

7. A laminated bearing comprising: a stack of thin sheets of bonded together sheet material and elastomer layers in alternate relation and some of said layers being segmented to provide a mosaic of connected sections accommodating flexing of the bearing in a plurality of planes.

8. The bearing of claim 7 wherein the sheet material comprises metal.

References Cited

UNITED STATES PATENTS 3,071,422    1/1963    Hinks _____ 308—237
3,083,065    3/1963    Hinks et al. _____ 308—237

FOREIGN PATENTS 733,001    6/1932    France.

MARTIN P. SCHWADRON, *Primary Examiner.*

FRANK SUSKO, *Assistant Examiner.*